(No Model.)
W. Q. PREWITT.
PORTABLE COMBINED BATH TUB AND HEATER.
No. 248,790. Patented Oct. 25, 1881.
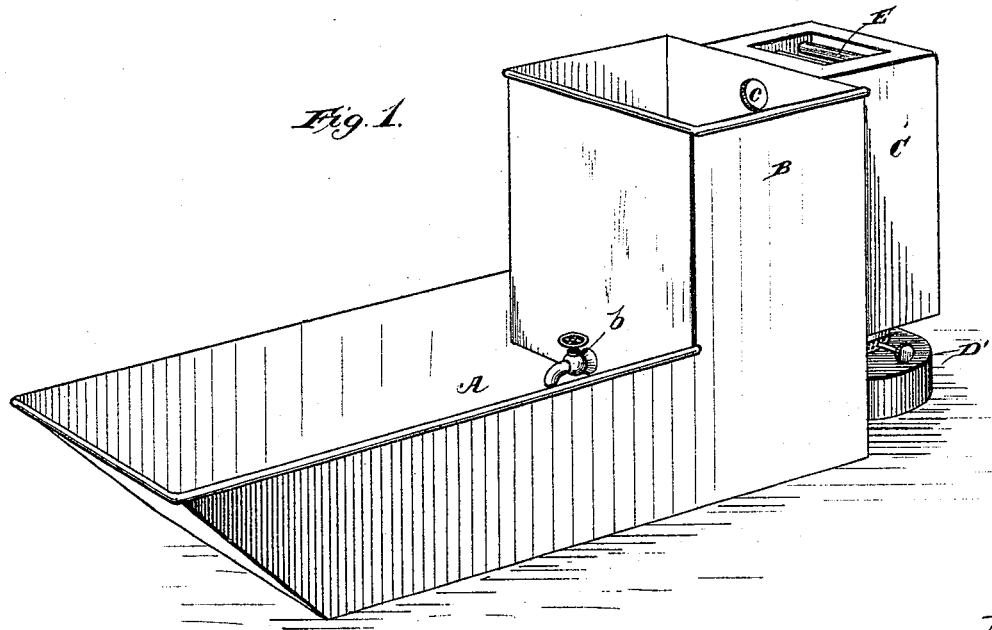
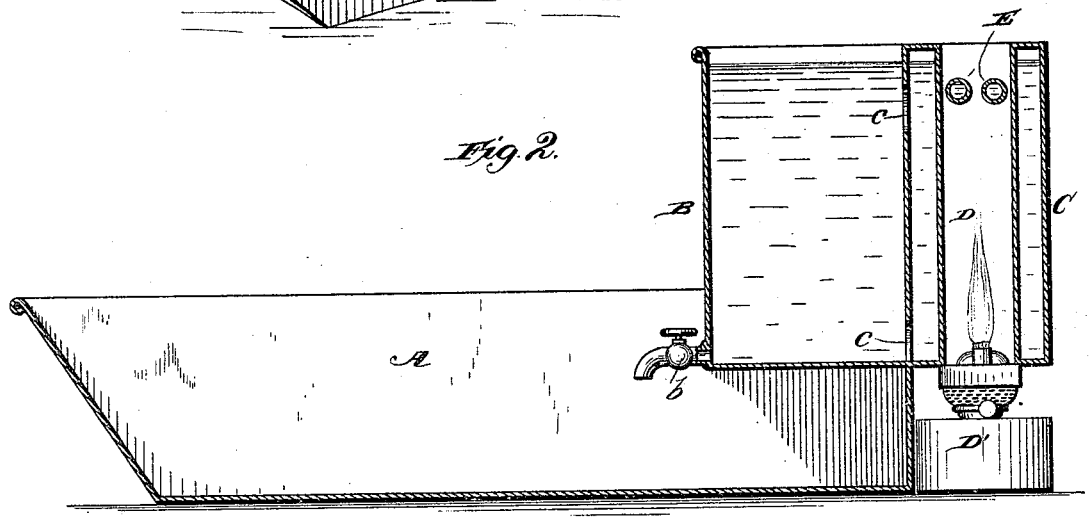
Witnesses.
Robert Everett
A. H. Norris.
Inventor.
William Q. Prewitt.
By James L. Norris.
Atty.

UNITED STATES PATENT OFFICE.

WILLIAM Q. PREWITT, OF LEXINGTON, KENTUCKY.

PORTABLE COMBINED BATH-TUB AND HEATER.

SPECIFICATION forming part of Letters Patent No. 248,790, dated October 25, 1881.

Application filed September 24, 1881. (No model.)

*To all whom it may concern:*

Be it known that I, WILLIAM Q. PREWITT, a citizen of of the United States, residing at Lexington, in the county of Fayette and State of Kentucky, have invented new and useful Improvements in Portable Combined Bath-Tubs and Heaters, of which the following is a specification.

This invention relates to certain improvements in that class of bath-tubs in which a heating arrangement is employed for the purpose of heating the water to the desired temperature for bathing.

The object of my invention is to provide a portable bath-tub with an attached water-reservoir and a heating-chamber, the capacity of the reservoir and heating-chamber being such that they are adapted to contain sufficient to supply the bath-tub with the amount of water ordinarily required for bathing purposes, the entire structure constituting a combined portable bath-tub, water-reservoir, and heater, which is comparatively light, simple in construction, and capable of convenient transportation.

My invention is illustrated in the accompanying drawings, in which Figure 1 represents a perspective view of a bath-tub embodying my invention, and Fig. 2 a vertical sectional view of the same.

The letter A indicates the bath-tub; and B, the water tank or reservoir, located at one end of the bath-tub and elevated above the top of the same, so that the entire capacity of the tub is available to the bather, and so that the water contained in the tank, when heated to the desired temperature, can be admitted to the tub through an ordinary stop-cock, *b*.

C is the heating-chamber, immediately adjoining the water-tank, and is composed of inner and outer walls or casings, closed at top and bottom to constitute a water-chamber, and communicating with the tank B through the top and bottom ports or passages, *c c*.

The tank and heating-chamber are made of sheet metal, and are preferably of rectangular form, as by this construction one of the sides of the water-tank will also form one of the sides or walls of the heating-chamber. The central space formed by the inner walls of the heating-chamber serves as a flue or chimney, D, for the passage of heat from the heater D', which is simply an ordinary coal-oil lamp or other burner, as such I have found sufficient to heat the water to any temperature desired.

Near the top of the chamber C is a pipe or tube, E, (one or more,) extending across the flue or chimney and opening into said chamber of which it forms a part, the object of which is to permit the water to circulate across and also be heated in said pipe or tube, the latter also subserving the function of intercepting the heat from the burner or lamp and deflecting it toward the walls or casing of the chamber C. It also furnishes additional heating-surface for said chamber.

The lamp or heater D' is secured in the bottom of the heating-chamber in any suitable manner, and a series of tubes or pipes, E, may be arranged across the chamber, one below the other, for increasing the heating effect and water circulation.

When it is desired to use the bath-tub the tank B is filled with water by hand or from a supply-pipe, which will enter and fill the chamber C through the ports or openings *c c*. The lamp or burner is then lighted, and the heat from the same, ascending the flue or chimney formed by the inner wall of the heating-chamber, will cause the water in the same to be rapidly heated and circulated. The pipe or tube E, as before stated, will obstruct the passage of the heat and deflect it toward the walls of the heating-chamber, and as it communicates with and forms part of said chamber it will also form additional means for heating the water therein. As the water in the chamber C becomes heated to a temperature higher than that in the tank B it will flow into the latter through the openings *c c*, displacing the water contained therein, which, in turn, will enter the chamber C to be heated, and thus a constant circulation of the water in the tank and chamber will be kept up until the water has attained the desired temperature, when it can be drawn off into the tub by means of the stop-cock *b*.

The tub, water-tank, and heating-chamber are preferably made of sheet metal and integral with each other; but it is obvious that the tank and heating-chamber may be made separate from the tub and applied to any of the ordinary tubs in general use without departure from the principle of my invention.

Heretofore various arrangements have been invented for heating the water to be used in a bath-tub, and therefore I do not broadly claim a bath-tub provided with a water-heating chamber. So far as I am aware, however, such bath-tubs and heating devices, as heretofore constructed, have been complicated and cumbersome, and are not adapted for convenient transportation to different parts of a dwelling. In my invention the parts are brought into a close relation to each other, and the bath-tub supports the water-reservoir and heating-chamber, which are of a capacity just sufficient to supply the tub with the amount of water ordinarily used for bathing purposes. The entire structure occupies but little more space than a bath-tub alone, and its portability renders it very desirable over permanent fixtures.

Having thus described my invention, what I claim, and desire to secure by Letters Patent, is—

A portable bath-tub provided with an attached water-reservoir at one end, constructed with a water-heating chamber formed by double walls and a vertical flue through the same, which is open at its upper and lower ends, and is adapted to be heated by a lamp or similar burner at the lower open end of said flue, substantially as described and shown.

In testimony whereof I have hereunto set my hand in the presence of two subscribing witnesses.

W. Q. PREWITT.

Witnesses:
ALBERT H. NORRIS,
JAMES A. RUTHERFORD.